(12) United States Patent
Chou et al.

(10) Patent No.: US 8,948,493 B2
(45) Date of Patent: Feb. 3, 2015

(54) METHOD AND ELECTRONIC DEVICE FOR OBJECT RECOGNITION, AND METHOD FOR ACQUIRING DEPTH INFORMATION OF AN OBJECT

(71) Applicant: Wistron Corporation, New Taipei (TW)

(72) Inventors: Chia-Te Chou, New Taipei (TW);
Shou-Te Wei, New Taipei (TW);
Chih-Hsuan Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 181 days.

(21) Appl. No.: 13/792,101

(22) Filed: Mar. 10, 2013

(65) Prior Publication Data

US 2014/0009382 A1    Jan. 9, 2014

(30) Foreign Application Priority Data

Jul. 3, 2012   (TW) .............................. 101123879 A (51) Int. Cl.
*G06K 9/00* (2006.01)
*G06F 3/01* (2006.01)

(52) U.S. Cl.
CPC ..................................... *G06F 3/017* (2013.01)
USPC ............................. 382/145; 345/419; 348/42

(58) Field of Classification Search
USPC .............. 382/154; 345/419, 422, 428, 42, 51; 356/12
See application file for complete search history.

(56) References Cited

U.S. PATENT DOCUMENTS

| | | | | |
|---|---|---|---|---|
| 6,961,466 B2 * | 11/2005 | Imagawa et al. | ............... | 382/190 |
| 7,142,209 B2 * | 11/2006 | Uyttendaele et al. | ......... | 345/427 |
| 8,786,682 B2 * | 7/2014 | Shpunt et al. | .................... | 348/50 |
| 8,798,358 B2 * | 8/2014 | El Dokor et al. | ............. | 382/154 |
| 8,803,801 B2 * | 8/2014 | El Dokor et al. | ............. | 345/156 |
| 2002/0041327 A1 | 4/2002 | Hildreth et al. | | |
| 2008/0118156 A1 * | 5/2008 | Okada | ........................... | 382/195 |
| 2008/0122835 A1 | 5/2008 | Falco, Jr. | | |
| 2010/0002948 A1 * | 1/2010 | Gangwal et al. | .............. | 382/254 |
| 2011/0096832 A1 | 4/2011 | Zhang et al. | | |
| 2011/0211073 A1 | 9/2011 | Foster | | |
| 2012/0235996 A1 * | 9/2012 | Zhang | ........................... | 345/419 |
| 2013/0050411 A1 * | 2/2013 | Kawahara | ........................ | 348/42 |
| 2013/0266209 A1 * | 10/2013 | Matsuda | ....................... | 382/154 |

FOREIGN PATENT DOCUMENTS

WO        2011059857 A2    5/2011

OTHER PUBLICATIONS

Office Action dated May 9, 2014 for Taiwanese Patent Application No. 101123879.

* cited by examiner

*Primary Examiner* — Samir Ahmed
(74) *Attorney, Agent, or Firm* — The Mueller Law Office, P.C.

(57) ABSTRACT

A method for recognizing an object from two original images, includes the steps of accessing the two original images, reducing resolutions of the two original images so as to generate two resolution-reduced images, respectively, calculating a plurality of shift amounts, each of which is between two corresponding pixels in pixel blocks that have similar content and that are respectively in the two resolution-reduced images and generating a low-level depth image based on the shift amounts, determining an object area of the low-level depth image containing the object therein, and obtaining a sub-image, from one of the original images, corresponding to the object area of the low-level depth image, thereby recognizing the object based on the sub-image.

22 Claims, 5 Drawing Sheets

(LEFT)

METHOD AND ELECTRONIC DEVICE FOR OBJECT RECOGNITION, AND METHOD FOR ACQUIRING DEPTH INFORMATION OF AN OBJECT

CROSS-REFERENCE TO RELATED APPLICATION

This application claims priority of Taiwanese Patent Application No. 101123879, filed on Jul. 3, 2012, and the disclosure of which is incorporated herein by reference.

BACKGROUND OF THE INVENTION

1. Field of the Invention

The present invention relates to a recognition method, more particularly to a method for recognizing an object from two images, a method for acquiring depth information of an object from two images, and an electronic device for implementing the same.

2. Description of the Related Art

At present, a common input device for an electronic apparatus may be at least one of a computer mouse, a keyboard, and a touch screen which also serves as an output interface. For promoting freedom of human-machine interaction, there is a technique using a recognition result of voice, image, etc. as an input command. Moreover, a method which utilizes image recognition of body movements and gestures to perform operations has been undergone constant improvement and now does faster calculations. Relevant techniques have been developed from requiring wearing recognizable articles of clothing or gloves into directly locating a human body or a hand from an image for subsequent recognition of body movements and gestures.

A conventional technique is to generate volume elements (voxels) according to a depth image, and to identify a human body and to remove a background behind the human body based on the volume elements. In this way, extremity skeletons of the human body may be further identified so as to obtain an input command by recognizing body movements according to a series of images containing the extremity skeletons.

A conventional method for generating a depth image utilizes a traditional camera in combination with a depth camera to capture images.

The aforesaid depth camera adopts a Time of Flight (ToF) technique which is capable of measuring a distance between an object and the depth camera by calculating the time it takes for an emitted infrared light to hit and to be reflected by the object.

There is another depth camera, such as the depth camera provided in the game console available from Microsoft Corporation, that utilizes a Light Coding technique. The Light Coding technique makes use of continuous light (e.g., infrared light) to encode a to-be-measured space, reads the light that encodes the space via a sensor, and decodes the light read thereby via chip computation so as to generate an image that contains depth information of the space. A key to the Light Coding technique relies on laser speckles. When a laser light illuminates a surface of an object, reflected dots, which are called laser speckles, are formed. The laser speckles are highly random and have shapes varying according to a distance between the object and the depth camera. The laser speckles on any two spots with different depths in the same space have different shapes, such that the whole space is marked. Therefore, for any object that enters the space and moves in the space, a location thereof may be definitely recorded. In the Light Coding technique, emitting the laser light so as to encode the to-be-measured space corresponds to generation of the laser speckles.

However, the depth camera is not yet available to all at present, and the depth image obtained thereby is not precise enough and is merely suitable for recognizing extremities. If it is desired to recognize a hand gesture by utilizing the aforementioned depth image, each finger of a hand may not be recognized when the hand is slightly away from the depth camera, such that the conventional depth camera is hardly a good solution for hand recognition.

SUMMARY OF THE INVENTION

Therefore, an object of the present invention is to provide a method which is adapted for recognizing an object from two images, and which maintains precision while significantly reducing computational complexity.

Accordingly, a method, according to the present invention, is adapted for recognizing an object from two original images, which are captured at the same time respectively by two cameras that are spaced apart from each other and that have an overlapping field of view containing the object. The method is to be implemented by an electronic device and comprises the steps of:

(A) configuring the electronic device to access the two original images;

(B) configuring the electronic device to reduce resolutions of the two original images so as to generate two resolution-reduced images, respectively;

(C) configuring the electronic device to calculate a plurality of shift amounts, each of which is between two corresponding pixels in pixel blocks that have similar content and that are respectively in the two resolution-reduced images, and to generate a low-level depth image based on the shift amounts, a larger one of the shift amounts representing a shallower depth on the low-level depth image;

(D) configuring the electronic device to determine an object area of the low-level depth image containing the object therein; and (E) configuring the electronic device to obtain a sub-image, from one of the original images, corresponding to the object area of the low-level depth image determined in step (D), thereby recognizing the object based on the sub-image.

Another object of the present invention is to provide a method which is adapted for acquiring depth information of an object from two original images, and which maintains precision while significantly reducing computational complexity.

Accordingly, the method, according to the present invention, is adapted for acquiring depth information of an object from two original images, which are captured at the same time respectively by two cameras that are spaced apart from each other and that have an overlapping field of view containing the object. The method is to be implemented by an electronic device and comprises the steps of:

(a) configuring the electronic device to access the two original images;

(b) configuring the electronic device to reduce resolutions of the two original images so as to generate two resolution-reduced images, respectively;

(c) configuring the electronic device to calculate a plurality of shift amounts, each of which is between two corresponding pixels in pixel blocks that have similar content and that are respectively in the two resolution-reduced images, and to generate a low-level depth image based on the shift amounts, a larger one of the shift amounts representing a shallower depth on the low-level depth image;

(d) configuring the electronic device to determine an object area of the low-level depth image containing the object therein;

(e) configuring the electronic device to obtain two sub-images respectively, from the two original images, corresponding to the object area of the low-level depth image determined in step (d); and (f) configuring the electronic device to calculate a plurality of shift amounts, each of which is between two corresponding pixels in pixel blocks that have similar content and that are respectively in the two sub-images obtained in step (e), and to generate a high-level depth image of the object to serve as the depth information based on the shift amounts, a larger one of the shift amounts representing a shallower depth on the high-level depth image.

Yet another object of the present invention is to provide an electronic device for recognizing an object from two original images, which are captured at the same time respectively by two cameras that are spaced apart from each other and that have an overlapping field of view containing the object. The electronic device comprises an input unit, a storage unit and a processor.

The input unit is adapted to receive the original images.

The storage unit stores program instructions which are associated with a method for recognizing an object.

The processor is coupled to the input unit and the storage unit, and is configured to execute the program instructions stored in the storage unit so as to perform the following steps of (i) accessing the two original images, (ii) reducing resolutions of the two original images so as to generate two resolution-reduced images, respectively, (iii) calculating a plurality of shift amounts, each of which is between two corresponding pixels in pixel blocks that have similar content and that are respectively in the two resolution-reduced images, and generating a low-level depth image based on the shift amounts, a larger one of the shift amounts representing a shallower depth on the low-level depth image, (iv) determining an object area of the low-level depth image containing the object therein, and (v) obtaining a sub-image, from one of the original images, corresponding to the object area of the low-level depth image, and storing the sub-image in the storage unit, thereby recognizing the object based on the sub-image.

An effect of the present invention resides in that, by means of reducing resolutions of the two original images, determining the object area, and obtaining the sub-image corresponding to the object area, the present invention is capable of saving time and reducing complexity compared with determining a position of the object directly from the two original images. The sub-image may be utilized for subsequent recognition of a gesture of the object. Overall, the present invention saves time while maintaining precision.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
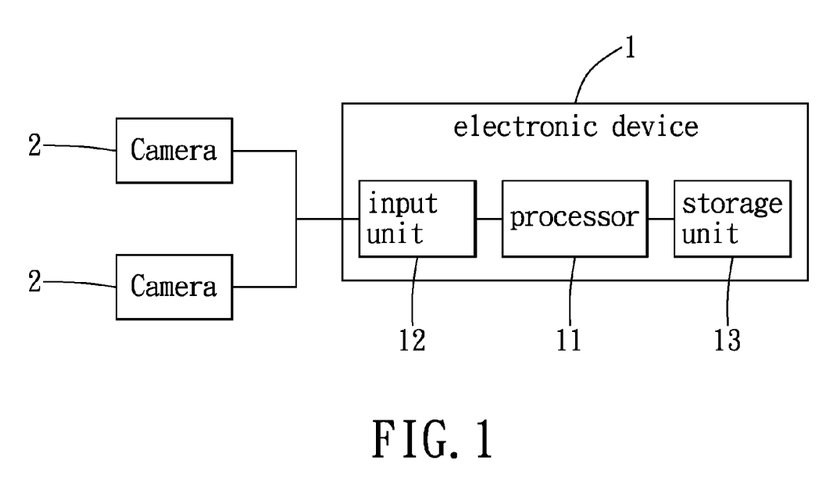
FIG. 1 is a block diagram illustrating an embodiment of an electronic device for recognizing an object according to the present invention.
Figure 2:
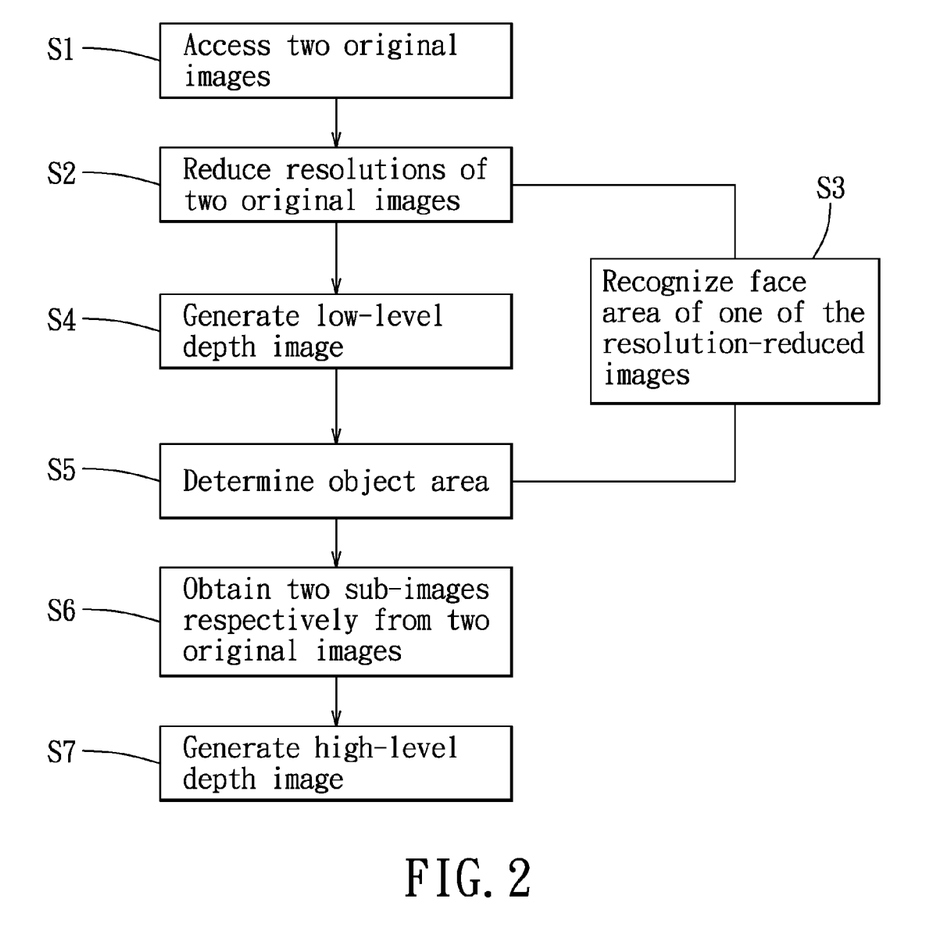
FIG. 2 is a flow chart illustrating an embodiment of a method for recognizing an object and a method for acquiring depth information of an object according to the present invention.

Referring to FIG. 1 and FIG. 2, an embodiment of a method and an electronic device for recognizing an object from two images, and an embodiment of a method for acquiring depth information of an object from two images are illustrated, and are applicable to a game console which may be control led by a gesture of an object. However, the present invention is not limited to such an application.

The object may be a hand of a user, and the gesture of the object may be a hand gesture. Alternatively, the gesture of the object may be a gesture of another object whose contour is to be recognized. The method for recognizing an object and the method for acquiring depth information of an object are to be implemented by an electronic device 1.

The electric device 1 is adapted for recognizing an object from two original images, which are captured at the same time respectively by two cameras 2 that are spaced apart from each other and that have an overlapping field of view containing the object. The electronic device 1 comprises an input unit 12, a storage unit 13 and a processor 11. The input unit 12 is adapted to receive the original images. In this embodiment, the input unit 12 is a transmission port to be coupled to a matrix camera unit, and the matrix camera unit includes the two cameras 2. The storage unit 13 stores program instructions which are associated with the method for recognizing an object, and the method for acquiring depth information of an object. In this embodiment, the storage unit 13 may be a memory or a register, and further stores results of calculations.

The processor 11 is coupled to the input unit 12 and the storage unit 13, and is configured to execute the program instructions stored in the storage unit 13 so as to perform the following steps.

In Step S1, the processor 11 is configured to access the two original images via the input unit 12.

The two cameras 2 are disposed on an image capturing plane, and the object is extended toward the image capturing plane. In this embodiment, the object is an extending hand of a user. The user naturally extends the object (i.e., the hand) toward the image capturing plane, and does not put the hand behind the user's back or above the user's head.

Figure 3:
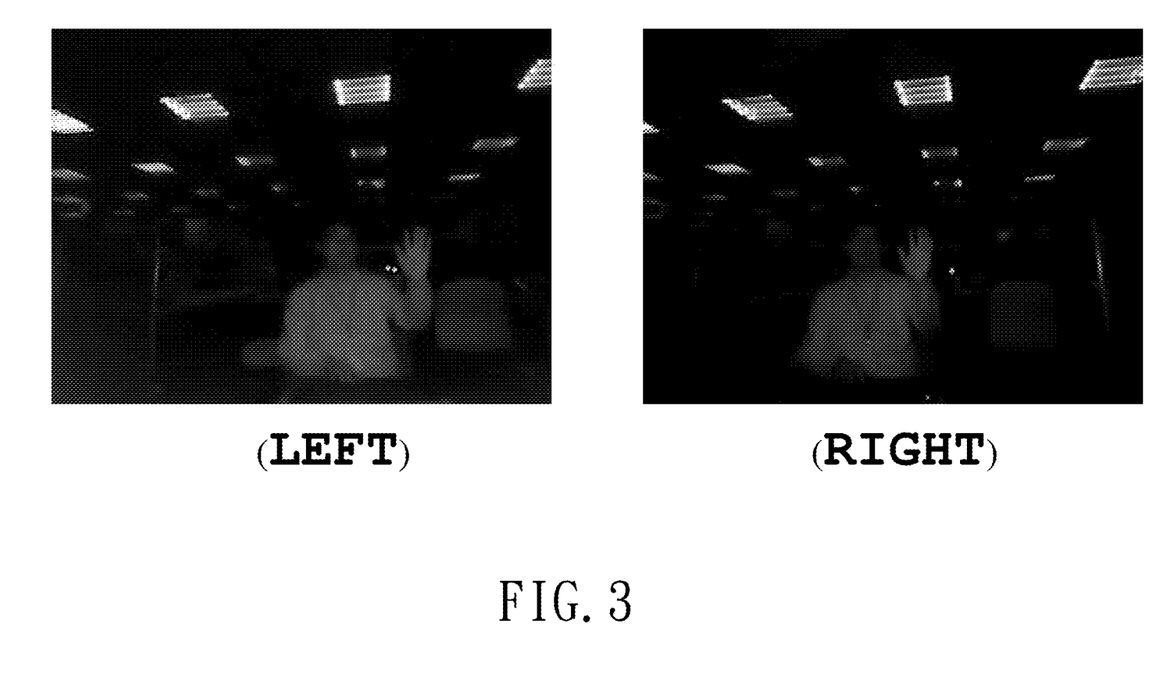
FIG. 3 illustrates two resolution-reduced images.

In step S2, the processor 11 is configured to reduce resolutions of the two original images so as to generate two resolution-reduced images (see FIG. 3), respectively. There are many ways for reducing a resolution of an image, such as redistributing positions of pixels after resolution reduction according to a desired reduction rate, and resampling an original image. For example, one pixel from any adjacent two of the pixels in the original image may be extracted, so as to compose a resolution-reduced image with $\frac{1}{2} \times \frac{1}{2}$ times of pixels.

Figure 4:
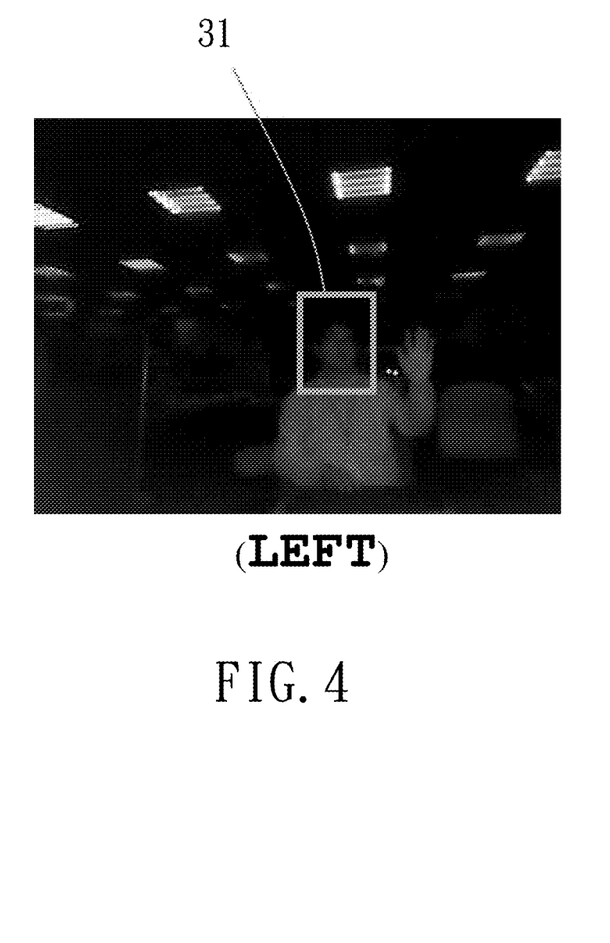
FIG. 4 shows one of the two resolution-reduced images for illustrating recognition of a face area.

The overlapping field of view further contains a face adjacent to the object. In step S3, the processor 11 is configured to recognize a face area 31 of one of the resolution-reduced images that contains the face therein (see FIG. 4). The face area 31 is recognized by comparing said one of the resolution-reduced images to a preset face template including facial features. In this embodiment, a left one of the two resolution-reduced images associated with a left one of the two cameras 2 is adopted to serve as said one of the resolution-reduced image. However, the face area 31 is not limited to be recognized from the left one of the two resolution-reduced images, and may be recognized instead from a right one thereof.

Figure 5:
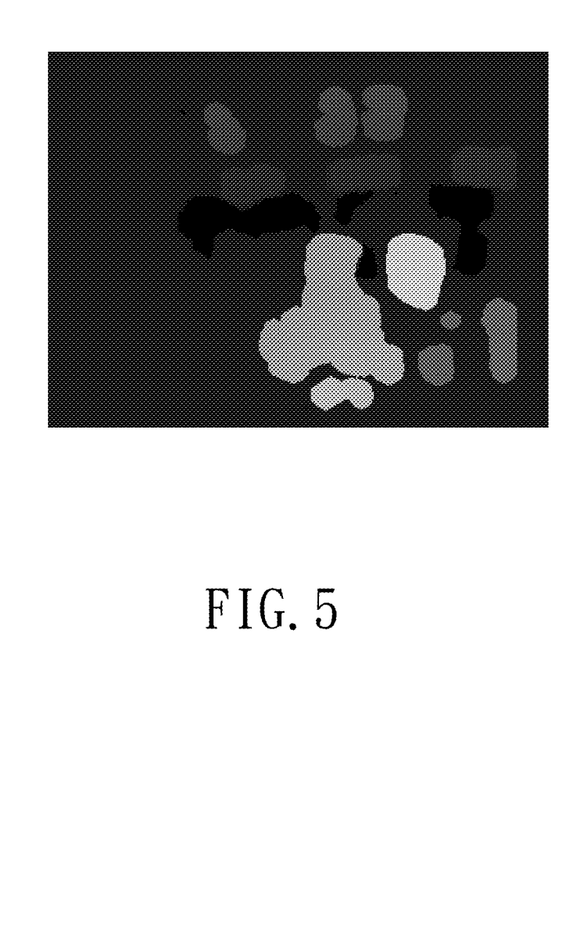
FIG. 5 illustrates a low-level depth image.

In step S4, the processor 11 is configured to calculate a plurality of shift amounts, each of which is between two corresponding pixels in pixel blocks that have similar content and that are respectively in the two resolution-reduced images, and to generate a low-level depth image (see FIG. 5) based on the shift amounts. A larger one of the shift amounts representing a shallower depth on the low-level depth image.

A way for finding the pixel blocks, that have similar content and that are respectively in the two resolution-reduced images, is to divide one of the two resolution-reduced images (such as the left one thereof) into multiple first blocks, and to compare each of the first blocks in the left one of the two resolution-reduced images with the other one of the two resolution-reduced images (such as the right one thereof). In this embodiment, the first blocks have substantially the same size. During comparison, each pixel in the right one of the two resolution-reduced images is defined with a respective second block which includes the pixel at the upper left corner and which has a size similar to that of the to-be-compared first block in the left one of the two resolution-reduced images, and a corresponding one of the second blocks which has the minimum image differences with respect to the to-be-compared first block is determined. The to-be-compared first block and the corresponding one of the second blocks serve as the pixel blocks in step S4.

Regarding comparison of the image differences, for example, when it is desired to compare the image differences between one of the first blocks (an alpha block) and one of the second blocks (a beta block), a sum of differences, each of which is between pixel values of a respective pixel in the alpha block and a corresponding pixel in the beta block (for example, pixels both in the first column and the first row), is calculated. The smaller value the sum has means smaller image differences exist between the alpha and beta blocks. Therefore, if the two resolution-reduced images are grey-level images, a sum of differences between grey-level values is calculated. If the two resolution-reduced images are color images, for each color channel (such as red, green and blue color channels), a respective sum of differences between pixel values is calculated, and the calculated sums are added together so as to obtain an overall value for all of the color channels. The overall value may then be used to measure the image differences.

In this step, since generation of a preliminary depth image (i.e., the low-level depth image) is implemented by utilizing the two resolution-reduced images, instead of the two original images, calculating time for the preliminary depth image may be significantly reduced.

Figure 6:
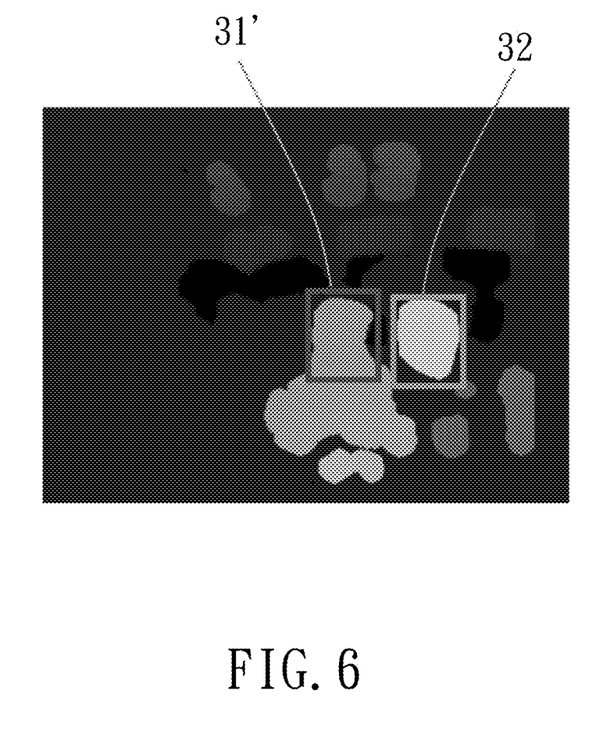
FIG. 6 shows determination of an object area from the low-level depth image.

In step S5, the processor 11 is configured to determine an object area 32 (see FIG. 6) of the low-level depth image containing the object therein. A way for determining the object area 32 is that, an area of the low-level depth image, which is adjacent to an area 31' in the low-level depth image corresponding to the face area 31 (see the left block in FIG. 6) and which has a depth shallower than that of the area 31', is determined as the object area 32 (see the right block in FIG. 6). If more than one face area 31 is recognized in step S3, the object area 32 is determined as an area that is adjacent to a shallowest one of plural areas of the low-level depth image corresponding to the face areas 31 and that has a depth shallower than that of said shallowest one of the plural areas. In this embodiment, the object area 32 is a hand area of the low-level depth image containing the hand therein.

It is noted that, the face area 31 recognized in step S3 is for determining the object area 32. Therefore, step S3 is not limited to be performed immediately subsequent to step S2, and may be performed any time after step S2 and prior to step S5.

In step S6, the processor 11 is configured to obtain two sub-images respectively, from the two original images, corresponding to the object area 32 of the low-level depth image determined in step S5, and to store the two sub-images in the storage unit 13. In this step, the object may be recognized based on one of the two sub-images obtained from a corresponding one of the two original images. After the object is recognized, a gesture of the object may be further identified according to a contour of the object. Alternatively, the gesture of the object may be identified more precisely after generation of depth information of the object in the subsequent step.

In step S7, the processor 11 is configured to calculate a plurality of shift amounts, each of which is between two corresponding pixels in pixel blocks that have similar content and that are respectively in the two sub-images, to generate a high-level depth image of the object to serve as the depth information based on the shift amounts, and to store the high-level depth image of the object in the storage unit 13. A larger one of the shift amounts represents a shallower depth on the high-level depth image. In this way, the depth information of the object is acquired from the two original images. In this step, since generation of a partial depth image (i.e., the high-level depth image) is implemented by utilizing the two sub-images, calculating time for the partial depth image may be significantly reduced while maintaining the resolution of the depth information of the object.

A reason for generating the high-level depth image of the object by means of the two sub-images resides in that, if it is required to identify the gesture of the object subsequently, the low-level depth image may be inadequate for use to identify details of the object (such as fingers of a hand) owing to its lower resolution. However, in the high-level depth image, details of the object may be recognized so as to identify features, such as a gesture, of the object in the high-level depth image, thereby obtaining an input command through analyzing the gesture of the object.

To sum up, by virtue of reducing resolutions of the two original images, determining the object area 32, and obtaining the two sub-images corresponding to the object area 32, a great amount of time may be saved compared with recognizing the object directly from the two original images. Afterward, the high-level depth image is generated so as to establish the depth information with relatively high resolution which may be provided for subsequent identification of the gesture of the object, such that the present invention saves time while maintaining precision.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for recognizing an object from two original images, which are captured at the same time respectively by two cameras that are spaced apart from each other and that have an overlapping field of view containing the object, the method to be implemented by an electronic device and comprising the steps of:

(A) configuring the electronic device to access the two original images;

(B) configuring the electronic device to reduce resolutions of the two original images so as to generate two resolution-reduced images, respectively;

(C) configuring the electronic device to calculate a plurality of shift amounts, each of which is between two corresponding pixels in pixel blocks that have similar content and that are respectively in the two resolution-reduced images, and to generate a low-level depth image based on the shift amounts, a larger one of the shift amounts representing a shallower depth on the low-level depth image;

(D) configuring the electronic device to determine an object area of the low-level depth image containing the object therein; and (E) configuring the electronic device to obtain a sub-image, from one of the original images, corresponding to the object area of the low-level depth image determined in step (D), thereby recognizing the object based on the sub-image.

2. The method as claimed in claim 1, the overlapping field of view further containing a face adjacent to the object, the method further comprising the step of, after step (B):

configuring the electronic device to recognize a face area of one of the resolution-reduced images that contains the face therein;

wherein, in step (D), the electronic device is configured to determine the object area of the low-level depth image that is adjacent to an area in the low-level depth image corresponding to the face area.

3. The method as claimed in claim 2, wherein the face area is recognized by comparing said one of the resolution-reduced images to a preset face template including facial features.

4. The method as claimed in claim 3, the two cameras being disposed on an image capturing plane, the object being extended toward the image capturing plane, wherein, in step (D), if more than one face area is recognized, the object area is determined as an area that is adjacent to a shallowest one of plural areas of the low-level depth image corresponding to the face areas and that has a depth shallower than that of said shallowest one of the plural areas.

5. A method for acquiring depth information of an object from two original images, which are captured at the same time respectively by two cameras that are spaced apart from each other and that have an overlapping field of view containing the object, the method to be implemented by an electronic device and comprising the steps of:

(a) configuring the electronic device to access the two original images;

(b) configuring the electronic device to reduce resolutions of the two original images so as to generate two resolution-reduced images, respectively;

(c) configuring the electronic device to calculate a plurality of shift amounts, each of which is between two corresponding pixels in pixel blocks that have similar content and that are respectively in the two resolution-reduced images, and to generate a low-level depth image based on the shift amounts, a larger one of the shift amounts representing a shallower depth on the low-level depth image;

(d) configuring the electronic device to determine an object area of the low-level depth image containing the object therein;

(e) configuring the electronic device to obtain two sub-images respectively, from the two original images, corresponding to the object area of the low-level depth image determined in step (d); and (f) configuring the electronic device to calculate a plurality of shift amounts, each of which is between two corresponding pixels in pixel blocks that have similar content and that are respectively in the two sub-images obtained in step (e), and to generate a high-level depth image of the object to serve as the depth information based on the shift amounts, a larger one of the shift amounts representing a shallower depth on the high-level depth image.

6. The method as claimed in claim 5, the overlapping field of view further containing a face adjacent to the object, the method further comprising the step of, after step (b):

configuring the electronic device to recognize a face area of one of the resolution-reduced images that contains the face therein;

wherein, in step (d), the electronic device is configured to determine the object area of the low-level depth image that is adjacent to an area in the low-level depth image corresponding to the face area.

7. The method as claimed in claim 6, wherein the face area is recognized by comparing said one of the resolution-reduced images to a preset face template including facial features.

8. The method as claimed in claim 7, the two cameras being disposed on an image capturing plane, the object being extended toward the image capturing plane, wherein, in step (d), if more than one face area is recognized, the object area is determined as an area that is adjacent to a shallowest one of plural areas of the low-level depth image corresponding to the face areas and that has a depth shallower than that of said shallowest one of the plural areas.

9. An electronic device for recognizing an object from two original images, which are captured at the same time respectively by two cameras that are spaced apart from each other and that have an overlapping field of view containing the object, said electronic device comprising:

an input unit adapted to receive the original images;

a storage unit storing program instructions which are associated with a method for recognizing an object; and a processor coupled to said input unit and said storage unit, and configured to execute the program instructions stored in said storage unit so as to perform the following steps of (i) accessing the two original images, (ii) reducing resolutions of the two original images so as to generate two resolution-reduced images, respectively, (iii) calculating a plurality of shift amounts, each of which is between two corresponding pixels in pixel blocks that have similar content and that are respectively in the two resolution-reduced images, and generating a low-level depth image based on the shift amounts, a larger one of the shift amounts representing a shallower depth on the low-level depth image, (iv) determining an object area of the low-level depth image containing the object therein, and (v) obtaining a sub-image, from one of the original images, corresponding to the object area of the low-level depth image, and storing the sub-image in said storage unit, thereby recognizing the object based on the sub-image.

10. The electronic device as claimed in claim 9, wherein the program instructions are further associated with a method for acquiring depth information of an object;
wherein, in step (v), said processor is further configured to obtain another sub-image, from the other one of the original images, corresponding to the object area of the low-level depth image, and to store the another sub-image in said storage unit; and
wherein said processor is further configured through executing the program instructions to perform the step of:
(vi) calculating a plurality of shift amounts, each of which is between two corresponding pixels in pixel blocks that have similar content and that are respectively in the two sub-images, and generating a high-level depth image of the object to serve as the depth information based on the shift amounts, a larger one of the shift amounts representing a shallower depth on the high-level depth image.

11. The electronic device as claimed in claim 9, the overlapping field of view further containing a face adjacent to the object, wherein said processor is further configured to perform the step of, after step (ii):
recognizing a face area of one of the resolution-reduced images that contains the face therein;
wherein, in step (iv), said processor is configured to determine the object area of the low-level depth image that is adjacent to an area in the low-level depth image corresponding to the face area.

12. The electronic device as claimed in claim 11, wherein the face area is recognized by comparing said one of the resolution-reduced images to a preset face template including facial features.

13. The electronic device as claimed in claim 12, the two cameras being disposed on an image capturing plane, the object being extended toward the image capturing plane, wherein, in step (iv), if more than one face area is recognized, the object area is determined as an area that is adjacent to a shallowest one of plural areas of the low-level depth image corresponding to the face areas and that has a depth shallower than that of said shallowest one of the plural areas.

14. A method for acquiring a sub-image containing an object from two original images, which are captured at the same time respectively by two cameras that are spaced apart from each other and that have an overlapping field of view containing the object, the method to be implemented by an electronic device and comprising the following steps of:
(A) configuring the electronic device to obtain two to-be-compared images respectively from the two original images, wherein at least one of the to-be-compared images is generated by reducing resolution of a corresponding one of the original images;
(B) configuring the electronic device to calculate a plurality of shift amounts, each of which is between two corresponding pixels in pixel blocks that have similar content and that are respectively in the two to-be-compared images, and to generate a low-level depth image based on the shift amounts, a larger one of the shift amounts representing a shallower depth on the low-level depth image;
(C) configuring the electronic device to determine an object area of the low-level depth image containing the object therein; and
(D) configuring the electronic device to obtain the sub-image, from at least one of the original images, corresponding to the object area of the low-level depth image determined in step (C).

15. The method as claimed in claim 14, the overlapping field of view further containing a body part adjacent to the object, the method further comprising the step of, after step (A):
configuring the electronic device to recognize a body part area of one of the to-be-compared images that contains the body part therein;
wherein, in step (C), the electronic device is configured to determine the object area of the low-level depth image that is adjacent to an area in the low-level depth image corresponding to the body part area.

16. The method as claimed in claim 15, wherein the body part area is recognized by comparing said one of the to-be-compared images to a preset template including body part features.

17. The method as claimed in claim 16, the two cameras being disposed on an image capturing plane, the object being extended toward the image capturing plane, wherein, in step (C), if more than one body part area is recognized, the object area is determined as an area that is adjacent to a shallowest one of plural areas of the low-level depth image corresponding to the body part areas and that has a depth shallower than that of said shallowest one of the plural areas.

18. An electronic device for acquiring a sub-image containing an object from two original images, which are captured at the same time respectively by two cameras that are spaced apart from each other and that have an overlapping field of view containing the object, said electronic device comprising:
an input unit adapted to receive the original images; and
a processor coupled to said input unit and configured to
(i) obtain two to-be-compared images respectively from the two original images, wherein at least one of the to-be-compared images is generated by reducing resolution of a corresponding one of the original images;
(ii) calculate a plurality of shift amounts, each of which is between two corresponding pixels in pixel blocks that have similar content and that are respectively in the two to-be-compared images, and generate a low-level depth image based on the shift amounts, a larger one of the shift amounts representing a shallower depth on the low-level depth image,
(iii) determine an object area of the low-level depth image containing the object therein, and
(iv) obtain the sub-image, from at least one of the original images, corresponding to the object area of the low-level depth image determined in step (iii).

19. The electronic device as claimed in claim 18, wherein, in step (iv), said processor is further configured to obtain another sub-image, from the other one of the original images, corresponding to the object area of the low-level depth image;
wherein said processor is further configured to:
(v) calculate a plurality of shift amounts, each of which is between two corresponding pixels in pixel blocks that have similar content and that are respectively in the two sub-images, and generate a high-level depth image of the object to serve as depth information of the object based on the shift amounts, a larger one of the shift amounts representing a shallower depth on the high-level depth image.

20. The electronic device as claimed in claim 18, the overlapping field of view further containing a body part adjacent to the object, wherein said processor is further configured to, after step (i):
recognize a body part area of one of the to-be-compared images that contains the body part therein;

wherein, in step (iii), said processor is configured to determine the object area of the low-level depth image that is adjacent to an area in the low-level depth image corresponding to the body part area.

21. The electronic device as claimed in claim 20, wherein the body part area is recognized by comparing said one of the to-be-compared images to a preset template including body part features.

22. The electronic device as claimed in claim 21, the two cameras being disposed on an image capturing plane, the object being extended toward the image capturing plane, wherein, in step (iii), if more than one body part area is recognized, the object area is determined as an area that is adjacent to a shallowest one of plural areas of the low-level depth image corresponding to the body part areas and that has a depth shallower than that of said shallowest one of the plural areas.

* * * * *